United States Patent Office 2,989,452
Patented June 20, 1961

2,989,452
IRRADIATED POLYMERS
Gaetano F. D'Alelio, South Bend, Ind., assignor to Bar Dal Inc., a corporation of Delaware
No Drawing. Filed Mar. 31, 1958, Ser. No. 724,878
16 Claims. (Cl. 204—154)

This invention relates to irradiated polymers of alkenyl aryl monomer. More specifically, it relates to irradiated polymers of alkenyl aryl monomers having aliphatic groups attached to the aryl nucleus thereof.

Attempts have been made to improve the softening point or heat resistance, solvent resistance, and other properties of polystyrene, by irradiation of polystyrene. Such attempts have been unsatisfactory, however, in view of the fact that such large amounts of irradiation are required to effect crosslinking of the polymeric molecules, that considerable side reactions, such as degradation, discoloration, etc., have occurred before crosslinking can be effected. Generally, it takes about 800 to 1000 times more radiation to effect crosslinking of polystyrene than it does for polyethylene. One reason for this may be that the resonating structure of the benzene ring acts as an energy reservoir absorbing practically all of the radiation energy.

In accordance with the practice of this invention, it has now been found that a polymer of styrene or other alkenyl aryl compound not having aliphatic groups attached to the aryl nuclei of the polymer other than that alkenyl group by which the polymer is formed can be improved by irradiation in intimate admixture with an alkenyl aryl polymer which does have aliphatic substituents attached to at least some of the aryl nuclei thereof, hereinafter sometimes referred to as crosslinking monomer. Furthermore, it has been found that polymerization products of a composition having copolymerizable alkenyl aryl monomers, one of which has no aliphatic substituent attached to the aryl nucleus thereof other than said alkenyl group and another of which does have such an aliphatic substituent attached to its aryl nucleus, sometimes hereinafter referred to as crosslinking polymer, can be advantageously irradiated.

Polymeric compounds preferred for the practice of this invention are those derived from alkenyl aryl monomers having as the polymerizable groups, vinyl and alpha-alkyl-vinyl groups in which the alkyl is methyl or ethyl; that is, alpha-methyl-vinyl (isopropenyl) and alpha-ethyl-vinyl groups. However, those having other polymerizable alkenyl groups can also be used satisfactorily, such as those having as the polymerizable group, allyl, methallyl, chlorallyl, alpha-chloro-vinyl, etc. The aromatic nuclei to which these polymerizable groups are attached are advantageously of the phenyl, naphthyl and diphenyl types.

In the crosslinking monomer unit, the second aliphatic substituent can be an alkyl group, an alkenyl group, as well as various substituted alkyl and alkenyl groups having substituents such as, for example, halo, carboxy, hydroxy, carboxylate, etc., as well as aryl and heterocyclic substituents. A plurality of such groups or combinations of such aliphatic groups can be on the same aryl nucleus. In addition to such aliphatic groups, the aryl nucleus can also have substituted thereon various non-reactive groups such as chloro, fluoro, bromo, iodo, cyano, aryl and heterocyclic groups.

Typical examples of the non-aliphatic-substituted polymerizable alkenyl aryl compounds include: styrene, alpha-methyl styrene, alpha-ethyl styrene, vinyl naphthalene, isopropenyl naphthalene, alpha-ethyl-vinyl naphthalene, vinyl diphenyl, isopropenyl diphenyl, alpha-ethyl-vinyl diphenyl, ar-chloro styrene, ar-chloro isopropenyl benzene, ar-bromo styrene, ar-fluoro styrene, ar-iodo styrene, vinyl chloro-naphthalene, vinyl chloro-diphenyl, isopropenyl bromo-naphthalene, isopropenyl bromo-diphenyl, alpha-ethyl-vinyl iodo-diphenyl, alpha-ethyl-vinyl iodo-naphthalene, ar-phenoxy-styrene, 2-vinyl 5-phenoxy-naphthalene, and similar other compounds.

The polymers used to effect crosslinking by irradiation in accordance with the practice of this invention, are derived from alkenyl aryl monomers of various types. First, the aryl nucleus is benzene, naphthalene, diphenyl and various other aryl nuclei, as well as various derivatives of the aforementioned nuclei whose substituents are relatively inert for the purposes of this invention, such as chloro, fluoro, bromo, iodo, aryl and heterocyclic groups attached to the aforementioned aryl nuclei. Secondly, the alkenyl group which participates in the polymerization or copolymerization is advantageously of a vinyl group but can also be any other polymerizable or copolymerizable alkenyl such as, for example, isopropenyl, alpha-ethyl-vinyl, allyl, methallyl, chlorallyl, chloro-vinyl, crotyl, etc. Thirdly, the aliphatic group present in the polymer which is used to facilitate crosslinking by irradiation, includes the following types of groups: alkyl, alkenyl, carboxy, carboxylate, carboxy-alkyl, carboxylate-alkyl, hydroxy-alkyl, alkoxy-alkyl, aryloxy-alkyl, cyclo-alkoxy-alkyl, etc.

Typical alkyl groups that can be present include: methyl, ethyl, propyl, butyl, amyl, hexyl, heptyl, etc., as well as the cycloalkyl groups such as, cyclohexyl, methyl cyclohexyl, etc. Except for reasons of availability and economy, there is no upper limit to the number of carbon atoms that can be present in such alkyl groups. In fact, the presence of a plurality of carbon atoms in an alkyl group, such as 2 to 8 or more, is somewhat advantageous in that it gives a greater number of points at which irradiation may effect crosslinking. Alkenyl groups which may be used as the aliphatic group preferred to include those listed above as having tendencies to polymerize or copolymerize and also those which have less tendency to polymerize, for example, those in which the unsaturated group, or groups, that is, double bonds, triple bonds, or plurality of either, is farther removed from the aromatic nucleus or possibly hindered from polymerizing by the presence of a large group on one of the carbons of the double bond. Such alkenyl groups include beta-isopropyl-vinyl, beta-butyl-vinyl, beta-n-butyl isopropenyl, pentenyl, hexenyl, octenyl, etc. When said aliphatic group is one of the alkenyl groups indicated above as relatively easily polymerizable or copolymerizable, it is desirable for the purposes of this invention that the polymerization of the monomer containing such group be stopped before the polymer has reached an insoluble or infusible state. For example, divinyl benzene itself can be used to prepare partial polymers which are fusible and soluble. This is accomplished by stopping the polymerization after it has proceeded for only a short period. Such partial polymers of divinyl benzene and of other polyalkenyl aryl compounds having two or more polymerizable alkenyl groups can be used in the practice of this invention.

Alkyl and alkenyl groups having various groups substituted thereon can also be used, for example, those having halo, carboxy, carboxylate, hydroxy, alkoxy, aryloxy, etc. Typical substituted groups include: chlormethyl, chloro-ethyl, chloro-propyl, chloro-hexyl, chloro-methyl, trifluoro-methyl, fluoro-ethyl, bromo-propyl, chloro-butyl, chloro-amyl, etc., chloro-butenyl, chloro-hexenyl, fluoro-heptenyl, bromo-octenyl, etc., carboxy-methyl, carboxy-ethyl, carboxy-propyl, carboxy-butyl, carboxy-heptyl, carboxy-nonyl, etc., and the esters thereof, hydroxy-alkyls such as methylol, ethylol, propylol, butylol, amylol, octylol, etc., ethoxy-methyl, ethoxy-ethyl, ethoxy-propyl, ethoxy-butyl, propoxy-methyl, propoxy-ethyl, propoxy-propyl, propoxy-butyl, butoxy-methyl, butoxy-ethyl, butoxy-propyl, butoxy-butyl, etc., phenoxy-ethyl, phenoxy-butyl, phenoxy-amyl, naphthoxy-propyl, naphthoxy-butyl, diphenyl-oxy-propyl, diphenyl-oxy-butyl, diphenyl-oxy-amyl, etc., phenethyl, phenyl-propyl, phenyl-butyl, phenyl-amyl, naphthyl-propyl, naphthyl-butyl, naphthyl-amyl, naphthyl-hexyl, etc., cyclohexoxy-ethyl, cyclohexoxy-propyl, cyclohexoxy-amyl, methyl cyclohexoxy-propyl, etc.

The amount of crosslinking monomer or crosslinking polymer to be added will vary depending on the properties of the materials to which it is added. For example, high molecular weight resins require less crosslinking agent to bring them to an infusible state, whereas a resin of lower molecular weight requires larger amounts of crosslinking agent. Although as little as 0.1 percent of crosslinking repeating units often effects notable changes in properties of the resin, especially where such repeating units are distributed as comonomer through at least a major portion of the polymeric materials of the composition in which it is contained, it is generally advantageous to have at least one percent or more of such crosslinking agent present, either as a comonomer in at least a major number of the polymer molecules, as a comonomer in a minor amount of the polymer molecules, or as a homopolymer of a fraction of the polymer molecules present in the polymeric composition.

Since the crosslinking monomer or polymer is present for the purpose of improving the properties of an alkenyl aryl group polymer having no aliphatic groups, as defined above, the crosslinking agent is generally desirably present in a minor amount, for example less than 50 percent by weight. However, where the difference in cost between the various types of monomers in the polymeric composition is small, or economic considerations are minor in comparison to the results desired, or the molecular weight of the respective monomers differs so greatly that on an equivalent basis a greater weight of crosslinking agent is required, then the proportion of crosslinking repeating units might represent as much as 75 percent of the polymer composition.

In the foregoing discussion references are to weight comparisons of the repeating units themselves and not a comparison of the respective weights of the polymers or copolymers in which they may be contained. For example, if a copolymer is used in an amount representing 20 percent of the total-polymer composition, and the crosslinking repeating unit in the copolymer represents 50 percent of the weight of that copolymer, then the percent of the crosslinking repeating unit actually is 10 percent of the total polymeric composition.

Methods of making the polymers used in the practice of this invention are well-known in the art. In view of the fact that the molecular weight is increased by irradiation, polymers of very low molecular weight can be used, for example 3,000, more advantageously 6,000 or greater. When the crosslinking monomeric units are highly concentrated in one polymer or copolymer and are used to crosslink other polymers containing the units free of a second aliphatic group, the molecular weight of the crosslinking polymer can be even less than 3,000 since it is eventually tied into the high molecular weight molecules of the other type.

It is generally desirable that the polymeric composition be molded into the shape in which it is ultimately to be used before the composition is irradiated. In some cases, however, it is suitable to machine or otherwise shape the article after irradiation. In certain cases, it may be satisfactory to irradiate a polymeric composition to a limited degree, short of producing infusibility, that is, to interrupt the irradiation at an early stage, and to complete the irradiation after the composition has been given its final shape or form.

Various other materials can be present in minor amounts in the polymeric compositions, such as, for example, plasticizers, lubricants, fillers, etc. Suitable fillers are silica, silica aerogel, titanium dioxide, calcium silicate, ferric oxide, chromic oxide, cadmium sulfide, asbestos, glass fibers, calcium carbonate, carbon black, lithopone, talc, etc.

The polymers can be in any suitable form for admixing with each other, or for mixing with the various other materials specified. The mixing can be effected in any convenient or appropriate manner. For example, mixing can be effected mechanically as on mixing mills, on a Banbury mixer, or in a single or double worm extruder. Such compounded mixtures can then be extruded as fibers, films, rods, etc., or as wire coatings, or coatings on fibrous materials, etc., and then irradiated. They can also be extruded in tubular form, such as pipes, molded into shaped articles, or blown into bottles, and in each case then irradiated.

The term "irradiation," as used herein, means high energy radiation and/or the secondary energies resulting from conversion of this electron energy to neutron or gamma radiation, said electron energies being at least about 100,000 electron volts. While various types of irradiation are suitable for this purpose, such as X-ray and gamma and beta rays, the radiation produced by high power electron linear accelerators has been found to be very conveniently and economically applicable and to give very satisfactory results. However, regardless of the type of irradiation and the type of equipment used for its generation or application, the use thereof in the treatment of polymeric materials as described herein is contemplated as falling within the scope of this invention so long as it is produced by or from electron energy of at least about 100,000 electron volts. While there is no upper limit to the electron energy that can be so applied advantageously, the effects desired in the practice of this invention can be accomplished without having to go above 50,000,000 electron volts. Generally, the higher the electron energy used, the greater is the depth of penetration into the massive structure of polymeric materials, and the shorter is the time of exposure required to accomplish the desired result. For other type of irradiation, such as gamma and X-rays, energy systems equivalent to the above range of electron volts are desirable.

It is intended that the term "irradiation" include what has been referred to in the prior art as "ionizing radiation" which has been defined as radiation possessing an energy at least sufficient to produce ions or to break chemical bonds and thus includes also radiations such as "ionizing particle radiation" as well as radiations of the type termed "ionizing electromagnetic radiation."

The term "ionizing particle radiation" has been used to designate the emission of electrons or highly accelerated nuclear particles such as protons, neutrons, alpha-particles, deuterons, beta-particles, or their analogs, directed in such a way that the particle is projected into the mass to be irradiated. Charged particles can be accelerated by the aid of voltage gradients by such devices as accelerators with resonance chambers, Van de Graff generators, betatrons, synchrotons, cyclotrons, etc. Neutron radiation can be produced by bombarding a selected light metal such as beryllium with positive particles of high energy. Particle radiations can also be obtained by the use of an atomic pile, radioactive isotopes or other natural or synthetic radioactive materials.

"Ionizing electromagnetic irradiation" is produced when a metallic target, such as tungsten, is bombarded with electrons of suitable energy. This energy is conferred to the electrons by potential accelerators of over 0.1 million electron volts (m.e.v.). In addition to radiations of this type, commonly called X-ray, an ionizing electromagnetic radiation suitable for the practice of this invention can be obtained by means of a nuclear reactor (pile) or by the use of natural or synthetic radioactive material, for example cobalt 60.

Various types of high power electron linear accelerators are commercially available, for example from Applied Radiation Corporation, Walnut Creek, California. In the following Example I, ARCO type travelling wave accelerator, model Mark I, operating at 3 to 10 million electron volts, was used to supply the irradiation. Other types of accelerators, such as supplied by High Voltage Engineering Corporation, Burlington, Massachusetts, or as described in United States Patent No. 2,763,609 and in British Patent No. 762,953 are satisfactory for the practice of this invention.

In the following examples, the radiation doses are reported in megareps, which represent 1,000,000 reps. A "rep" is defined, according to "Reactor Shielding Design Manual" edited by Theodore Rockwell III and published by D. Van Nostrand Company, Inc., 1st edition, 1956, as that radiation dosage which produces energy absorption in human tissue equal to 93 ergs per gram of tissue.

In the practice of this invention, changes in properties of the materials can often be noted after treatment with even less than 1 megarep. However, it is generally advantageous to use doses of 2 megareps or more. The degree of change in properties is dependent somewhat on the dosage, greater changes being effected by increasing the dosage.

The material to be treated is often advantageously irradiated while in a container made of a material such as aluminum or glass which will not substantially interfere with the irradiation. It is advantageous also to use polymeric materials, such as polyethylene, nylons, i.e. 66 nylon, polycaprolactam, etc. It can also be wrapped in film or foil impervious to vapors and gases, such as aluminum foil, polyethylene film, etc., which will prevent substantially the escape of volatile materials. It is often advantageous to avoid oxidation or side reactions by the use of an inert atmosphere such as nitrogen. Moreover, it is advantageous to prevent the temperature from approaching that at which the material is unstable. This can be accomplished by cooling the material before irradiation, for example with Dry Ice, or by dissipating the heat generated during irradiation.

Various methods of practicing the invention are illustrated by the following examples. These examples are intended merely to illustrate the invention and not in any sense to limit the manner in which the invention can be practiced. The parts and percentages recited therein and all through this specification, unless specifically provided otherwise, refer to parts by weight and percentages by weight. Unless indicated otherwise, the terms "polymers" and "polymeric" are intended to include "copolymers" and "copolymeric." Molecular weights given herein are Staudinger molecular weights.

*Example I*

Seventy parts of polystyrene and 30 parts of poly-ar-ethylstyrene are mixed intimately on a Banbury mixer and then extruded into film. This film is exposed to 30 megareps of irradiation. The irradiated product shows much improvement in softening point and solvent resistance, and resistance to discoloration by the irradiation when compared to a control sample of polystyrene similarly exposed to irradiation.

*Example II*

Fifty parts of polystyrene and 50 parts of poly-vinyltoluene are intimately mixed on a Banbury mixer and then extruded as film. The film is exposed to 35 megareps of irradiation from cobalt 60. The irradiated product shows considerable improvement in softening point, solvent resistance, and resistance to discoloration, when compared to a control sample of polystyrene which is similarly irradiated.

*Example III*

Eighty parts of poly-vinylnaphthalene is intimately mixed on a Banbury mixer with 20 parts of polyvinyl-ar-ethyl-naphthalene, extruded into a film, and then exposed to 20 megareps of irradiation from a Van de Graff generator. The irradiated product shows considerable improvement in softening point, solvent resistance, and resistance to discoloration by the irradiation when compared to a control sample of polymeric vinyl naphthalene similarly irradiated.

*Example IV*

Ninety parts of poly-vinyldiphenyl and 10 parts of poly-vinyl-ar-butyl-diphenyl are intimately mixed on a Banbury mixer, extruded in the form of a tube, and then exposed to 15 megareps of irradiation from bombarded beryllium. The irradiated product shows considerable improvement in softening point, solvent resistance, and resistance to discoloration by the irradiation when compared to a control sample of polymeric vinyl diphenyl similarly irradiated.

*Example V*

Seventy-five parts of polystyrene and 25 parts of a copolymer of 50 percent styrene and 50 percent ar-ethylstyrene, are intimately mixed and cast into bars which are exposed to 20 megareps of irradiation as in Example I. The irradiated product shows considerable improvement in softening point, solvent resistance, and resistance to discoloration upon irradiation in comparison to a control sample of polystyrene which is similarly irradiated.

*Example VI*

Seventy parts of poly-vinylnaphthalene and 30 parts of a copolymer of 20 percent isopropenyl isopropyl-naphthalene and 80 percent vinyl naphthalene are intimately mixed and extruded into film. The film is then irradiated as in Example I with a dosage of 25 megareps. The irradiated product shows considerable improvement in softening point, solvent resistance, and resistance to discoloration upon irradiation when compared to a control sample of polymeric vinyl naphthalene which is similarly irradiated.

*Example VII*

An intimate mixture of 60 parts of a copolymer of 75 percent styrene and 25 percent alpha-methyl-styrene, and 40 parts of a copolymer of 50 percent styrene and 50 percent vinyl octyl-naphthalene is extruded into a film and then exposed to 30 megareps of irradiation as in Example I. The irradiated product shows considerable improvement in softening point, resistance to solvents, and resistance to discoloration upon irradiation when compared to a control sample of the first copolymer similarly irradiated.

*Example VIII*

An intimate mixture of 50 parts poly-ar-chlorostyrene and 50 parts of a copolymer of 80 percent styrene and 20 percent isopropenyl isopropyl-diphenyl, is extruded into film and then exposed to 30 megareps of irradiation as in Example I. The irradiated product shows considerable improvement in softening point, solvent resistance, and in resistance to discoloration upon irradiation in comparison with a control sample of the polymeric ar-chlorostyrene which is similarly irradiated.

*Example IX*

An intimate mixture of 70 parts polystyrene and 30 parts of a copolymer of 80 percent styrene and 20 percent ethylstyrene is extruded into film and exposed to 80 megareps of irradiation as in Example I. The irradiated product shows considerable improvement in softening point, solvent resistance, and resistance to discoloration upon irradiation when compared to a control sample of polystyrene similarly irradiated.

*Example X*

An intimate mixture of 80 parts polystyrene and 20 parts polypara-(beta-acetoxy ethyl)-styrene is molded in the shape of a bottle and irradiated with 25 megareps as in Example I. The irradiated product shows considerable improvement in softening point, resistance to solvents, and resistance to discoloration upon irradiation in comparison with a control sample of polystyrene which is similarly irradiated.

The products made according to this invention can be used for the manufacture of various articles as indicated above, as well as the various other molded articles for which polystyrene and other resins are used, and used therefor in the manner in which polystyrene and the various other resins are used for such purposes.

While certain features of this invention have been described in detail with respect to various embodiments thereof, it will, of course, be apparent that other modifications may be made within the spirit and scope of this invention and it is not intended to limit the invention to the exact details shown above except insofar as they are defined in the following claims.

The invention claimed is:

1. A process for improving the heat-resistant properties of a thermoplastic polymeric alkenyl aryl composition, comprising irradiating said polymeric composition with at least 5 megareps of irradiation, said polymeric composition comprising about 1 to 75 percent by weight, based on the alkenyl aryl polymer components of the composition, of an alkenyl aryl repeating unit containing an aliphatic group attached to the aryl nucleus thereof in addition to said alkenyl group from which the polymeric chain is formed, said irradiation being high-energy, ionizing radiation, equivalent to at least 100,000 electron volts and said aliphatic group being selected from the class consisting of aliphatic hydrocarbon groups and the hydroxy, carboxy, carboxylate, halo, alkoxy, aryloxy, and cycloalkoxy derivatives thereof, and the aryl nuclei of said polymeric composition having no additional substituents except those selected from the class consisting of hydrocarbon and halogen groups.

2. A process of claim 1, in which the polymeric composition comprises a copolymer of at least 2 alkenyl aryl monomers, of which one monomer has no alkyl substituent substituted on the aryl nucleus other than the polymerizable alkenyl group, and of which another monomer does have such an aliphatic group substituted on the aryl nucleus thereof.

3. A process of claim 1, in which the polymeric composition comprises a polymer of a nuclear-substituted-alkyl alkenyl aryl compound mixed with a polymer of an alkenyl aryl compound having no aliphatic substituent thereon other than the polymerizable alkenyl group.

4. A process of claim 3, in which said latter polymer is a homopolymer.

5. A process of claim 3, in which both of said polymers are homopolymers.

6. A process of claim 1, in which said polymeric composition comprises polymeric styrene.

7. A process of claim 1, in which said polymeric composition comprises a copolymer of styrene.

8. A process of claim 7, in which said polymeric composition consists essentially of a copolymer of styrene and a minor part of said repeating units having a second aliphatic group attached to the aryl nucleus thereof.

9. A process of claim 1, in which said polymeric composition comprises a polymer of styrene and a polymer of an alkenyl aryl monomer having a second aliphatic substituent attached to the aryl nucleus thereof.

10. A process of claim 9, in which said second aliphatic substituent is an alkyl group.

11. A process of claim 1, in which said polymer composition comprises a major portion of polystyrene and a minor portion of an alkenyl aryl polymer in which at least some of the repeating units have a second aliphatic group attached to the aryl nucleus thereof.

12. A process of claim 11, in which said alkenyl aryl polymer is polymeric ar-ethyl styrene.

13. A process of claim 11, in which said alkenyl aryl polymer is a homopolymer of ar-ethyl styrene.

14. A process of claim 11, in which said alkenyl aryl polymer is polymeric vinyl toluene.

15. A process of claim 11, in which said alkenyl aryl polymer is polymeric ar-isopropyl styrene.

16. A process of claim 11, in which said alkenyl aryl polymer is ar-butyl styrene.

References Cited in the file of this patent

UNITED STATES PATENTS 2,836,553   Guthrie et al. _____ May 27, 1958

FOREIGN PATENTS 582,559   Great Britain _____ Nov. 20, 1946

OTHER REFERENCES

Ballantine et al.: "Brookhaven National Laboratory Report 414," pp. 1–14, October 1956.

Lawton et al.: "Nature" pp. 76, 77, July 11, 1953.

Bopp et al.: ORNL 1373, July 23, 1953, pp. 25, 27, 31, 38, 39 and 68–71.